Patented July 11, 1944

2,353,592

UNITED STATES PATENT OFFICE 2,353,592

AGE RESISTOR FOR RUBBER

Winfield Scott, Akron, Ohio, assignor to Wingfoot Corporation, Wilmington, Del., a corporation of Delaware No Drawing. Application August 31, 1940, Serial No. 355,095

12 Claims. (Cl. 260—802)

This invention relates to age resistors for rubber and more particularly to the use in rubber of ketone derivatives of terpenyl arylamines.

Many substances are known to prevent or retard the deterioration of rubber which is normally caused by the action of oxygen, light, heat, flexing and other influences, such preservative materials commonly being designated as antioxidants or age resistors. The choice of an age resistor in a given case is largely governed by the particular combination of properties imparted by it to the rubber stock employed.

According to the present invention, terpenyl arylamines prepared by the reaction of terpenes and arylamines are reacted with ketones to produce materials which are excellent age resistors for rubber.

When a terpene is reacted with a primary or secondary arylamine, preferably in the presence of a catalyst such as zinc chloride, hydrochloric acid or iodine, an addition product is formed which may be called a terpenyl arylamine. The preparation of such materials and their use in rubber are described in U. S. Patent 2,180,936 and U. S. Patent 2,189,736.

It has now been discovered that terpenyl arylamines may be further reacted with ketones, with the elimination of water, to produce condensation products that are very effective age resistors for rubber. The preparation of the age resistors of the present invention is illustrated by the following example.

Example

Two hundred grams of pinyl aniline (the addition product of equimolecular proportions of aniline and pinene), 200 grams of acetone and 5 grams of 50% hydriodic acid were placed in an autoclave and heated at 220–230° C. for 13½ hours. The autoclave was then cooled, the contents were removed and unreacted acetone, water and other volatile products were driven off by distilling the product at 5 mm. pressure to a temperature of 110° C. The residue consisted of a dark liquid and was used as an age resistor without further purification.

Various other terpenyl arylamines may be used in place of the pinyl aniline of the foregoing example. In preparing these terpenyl arylamines, any terpene may be employed, including both cyclic and olefinic terpenes. The monocyclic and dicyclic terpenes are preferred materials. Further representative examples of suitable terpenes are dipentene, limonene, terpinolene, phellandrene, menthadiene, sylvestrene, terpinene, santene, etc. Also, various natural products, such as turpentine and camphor oil, which contain substantial amounts of terpenes may be employed. Similarly, any primary or secondary arylamine may be used in preparing the terpenyl arylamine, including aniline, the naphthylamines, p-phenylene diamine, diphenylamine, phenyl - β - naphthylamine, phenyl - α - naphthylamine, N-methyl aniline, N - cyclohexyl-β-naphthylamine, etc. Aniline and diphenylamine give good results, are cheap and constitute a preferred group. Also, either the terpene or the arylamine may contain one or more substituents, such as alkyl, aryl, aralkyl, aryloxy and similar groups. Such radicals are substantially inert in the resultant age resistors and compounds containing them are, for the purposes of the present invention, equivalents of the simpler terpenyl arylamines, and are intended to be covered by the claims.

The terpenyl arylamines may be condensed with various ketones, including both aliphatic and aromatic ketones. Representative examples of suitable ketones are methyl ethyl ketone, mesityl oxide, diacetone alcohol, acetyl acetone, acetonyl acetone, phorone, isophorone, methyl propyl ketone, methyl isopropyl ketone, benzal acetone, acetophenone, etc. The aliphatic ketones, including saturated and unsaturated, straight-chain, branched chain, cyclic and ring-substituted ketones, constitute a preferred class.

The reaction between the ketone and the terpenyl arylamine is quite complex. For example, when the latter is secondary amino in character the amino hydrogen atom is replaceable and the ketone may react at that point. In addition, the ketone may react with the aryl nucleus, usually ortho or para to the amino group. It is also possible that other reactions may take place. As a result of the complexity of the reaction, the proportions of ketone and terpenyl arylamine are not critical but may be varied within wide limits. Ordinarily, about one-half to two mols of ketone will be used for each mol of terpenyl arylamine employed. Equimolecular proportions are preferred. If an excess of either reactant over the amount which will react is employed, the excess merely carries through to the product as an impurity which may be removed or not, according to the requirements of each case.

The temperature of reaction is not critical but will ordinarily lie between 200° C. and 250° C. Because of the relatively high temperatures employed, it is convenient to carry out the reaction in an autoclave.

The reaction is preferably carried out in the presence of an acidic condensation catalyst, of which a number are well known. Representative examples are zinc chloride, iodine, hydrochloric acid, hydrobromic acid, and phosphorous pentachloride. Ordinarily, these catalysts are employed in relatively small amount. However, if a free acid such as hydrochloric acid is used, an amount of acid sufficient to form the salt of the terpenyl arylamine may be desirable in some cases.

The efficacy of the materials was tested by milling the age resistor into rubber in accordance with the following formula, curing test samples and determining the physical characteristics thereof before and after ageing for 6 days under an oxygen pressure of 150 pounds per square inch and at a temperature of 50° C.

| | Parts by weight |
|---|---|
| Extracted pale crepe | 100.0 |
| Zinc oxide | 5.0 |
| Sulfur | 3.0 |
| Hexamethylene tetramine | 1.0 |
| Stearic acid | 1.5 |
| Age resistor | 1.0 |

The following representative data were obtained using the product of the example:

| Cure in min./°F. | Unaged | | | | Aged | | | | Per cent increase in weight |
|---|---|---|---|---|---|---|---|---|---|
| | Tensile | Elong. | Modulus | | Tensile | Elong. | Modulus | | |
| | | | 500% | 700% | | | 500% | 700% | |
| | $Kg./cm.^2$ | Per cent | | | $Kg./cm.^2$ | Per cent | | | |
| 35/285 | 118 | 825 | 19 | 58 | 122 | 810 | 20 | 68 | .06 |
| 50 | 146 | 790 | 25 | 87 | 134 | 765 | 25 | 92 | .12 |
| 70 | 159 | 750 | 32 | 117 | 134 | 700 | 34 | 130 | .27 |

The characteristics of high temperature ageing were tested in the following formula:

| | Parts by weight |
|---|---|
| Smoked sheet | 100.00 |
| Zinc oxide | 5.50 |
| Carbon black | 43.00 |
| Sulfur | 2.75 |
| Stearic acid | 4.00 |
| Pine tar | 5.70 |
| 2-mercaptobenzothiazole | 1.35 |
| Age resistor | 1.00 |

When the product of the example was incorporated into rubber in accordance with this formula and samples were cured and tested before and after ageing for 7 hours at an air pressure of 80 pounds per square inch and at a temperature of 114° C., the following results were obtained:

| Cure in min./°F. | Unaged | | | | Aged | | | |
|---|---|---|---|---|---|---|---|---|
| | Tensile | Elong. | Modulus | | Tensile | Elong. | Modulus | |
| | | | 500% | 700% | | | 500% | 700% |
| | $Kg./cm.^2$ | Per cent | | | $Kg./cm.^2$ | Per cent | | |
| 35/260 | 225 | 695 | 46 | 122 | 176 | 645 | 60 | 127 |
| 50 | 300 | 700 | 63 | 162 | 200 | 650 | 75 | 152 |
| 70 | 318 | 675 | 79 | 194 | 220 | 605 | 89 | 174 |
| 100 | 310 | 625 | 92 | 217 | 198 | 540 | 100 | 186 |
| 140 | 314 | 585 | 110 | 246 | 200 | 500 | 115 | 200 |

As demonstrated by these data the age resistors are very effective in retarding the deterioration of rubber both at high and at low temperatures.

While there have been described above certain preferred embodiments of the invention, the same is not limited thereto but only by the appended claims wherein it is intended to set forth all features of patentable novelty residing in the invention.

I claim:

1. A method of treating rubber which comprises vulcanizing it in the presence of the condensation product of a ketone and a terpenyl arylamine produced by the reaction of a terpene with an amine selected from the group consisting of primary and secondary arylamines.

2. A method of treating rubber which comprises vulcanizing it in the presence of the condensation product of an aliphatic ketone and a terpenyl arylamine produced by the reaction of a terpene with an amine selected from the group consisting of primary and secondary arylamines.

3. A method of treating rubber which comprises vulcanizing it in the presence of the condensation product of an aliphatic ketone and a terpenyl arylamine produced by the reaction of a terpene with a primary arylamine.

4. A method of treating rubber which comprises vulcanizing it in the presence of the condensation product of an aliphatic ketone and a terpenyl arylamine produced by the reaction of a terpene with a diarylamine.

5. A method of treating rubber which comprises vulcanizing it in the presence of the condensation product of acetone and a terpenyl arylamine produced by the reaction of a terpene with an amine selected from the group consisting of primary and secondary arylamines.

6. A method of treating rubber which comprises vulcanizing it in the presence of the reaction product of acetone and the addition product of pinene and aniline.

7. A rubber product which has been vulcanized in the presence of the condensation product of a ketone and a terpenyl arylamine produced by the reaction of a terpene with an amine selected from the group consisting of primary and secondary arylamines.

8. A rubber product which has been vulcanized in the presence of the condensation product of an aliphatic ketone and a terpenyl arylamine produced by the reaction of a terpene with an amine selected from the group consisting of primary and secondary arylamines.

9. A rubber product which has been vulcanized in the presence of the condensation product of acetone and a terpenyl arylamine produced by the reaction of a terpene with an amine selected from the group consisting of primary and secondary arylamines.

10. A rubber product which has been vulcanized in the presence of the reaction product of acetone and the addition product of pinene and aniline.

11. A rubber product which has been vulcanized in the presence of the condensation product of an aliphatic ketone and a terpenyl arylamine produced by the reaction of a terpene with a primary arylamine.

12. A rubber product which has been vulcanized in the presence of the condensation product of an aliphatic ketone and a terpenyl arylamine produced by the reaction of a terpene with a diarylamine.

WINFIELD SCOTT.